Figure 1:
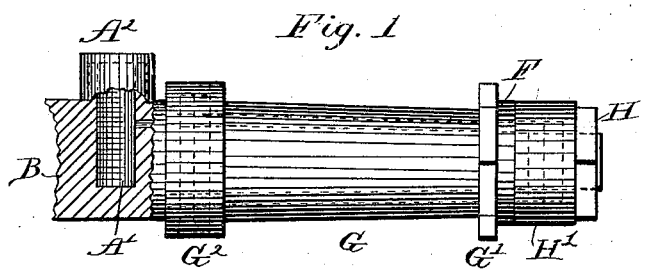

(No Model.)

H. OLSON.
VEHICLE AXLE.

No. 309,869. Patented Dec. 30, 1884.

Witnesses
Percy G. Bowen
L. Melchior

Inventor
Holcomb Olson
G. W. Balloch
Attorney.

UNITED STATES PATENT OFFICE.

HOLCOMB OLSON, OF OLESBURG, KANSAS.

VEHICLE-AXLE.

SPECIFICATION forming part of Letters Patent No. 309,869, dated December 30, 1884.

Application filed September 17, 1884. (No model.)

*To all whom it may concern:*

Be it known that I, HOLCOMB OLSON, of Olesburg, in the county of Pottawatomie and State of Kansas, have invented a new and useful Improvement in Buggy and Wagon Axles; and I do hereby declare that the following is a full and exact description of the same, reference being had to the accompanying drawings, and to the letters of reference marked thereon.

The object of this improvement is a conveniently-lubricated axle for buggies and wagons and prevention of the leakage and waste of the matter usually applied to lubricating the parts. These results are attained by the mechanism illustrated in the drawings herewith filed as part hereof, in which the same letters of reference denote the same parts in the different views.

Figure 3:
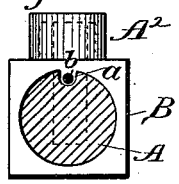
Figure 5:
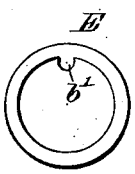
Figure 4:
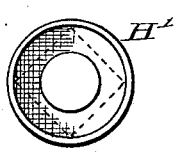
Figure 2:
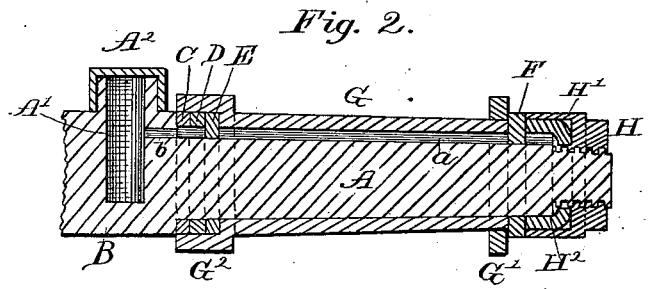

Figure 1 is a sectional side elevation of an axle embodying the features of my improvement. Fig. 2 is a longitudinal vertical section of the same. Fig. 3 is a transverse section. Figs. 4 and 5 are representations of detached parts.

A is the axle, provided with a groove, $a$, along its top, connecting by means of a perforation, $b$, with an oil-cup, A', located in the body of the axle-tree B. The oil-cup A' is partly formed by a screw-threaded vertical extension of the axle-tree, for the attachment of a correspondingly-threaded cap or cover, $A^2$, for excluding dust or other improper matter from the oil-cup, which may be formed by a tube screwed into a socket in the axle-tree or other suitable construction.

G is the boxing, having an octagonal lateral projection, G', at its outer end and a recessed enlargement, $G^2$, at its inner end, which fits over a metal washer, C, movably fitted to the axle, a metal washer, E, provided with an inner extension or lug, as fully shown at $b'$, Fig. 4, which enters the groove $a$, by means of which the washer E is held stationary on the axle, and a leather washer, D, intermediate of the washer C and washer E, and so located for a purpose hereinafter set forth.

F is a stationary washer, constructed in the same manner as the washer E.

H is the axle-nut, having recessed enlargement H' for the insertion of leather packing $H^2$, which will be flanged inwardly over the corner of the axle, when the nut H is adjusted, as fully shown in Fig. 2. The octagonal projection or nut G' of the boxing G is detachable for the purpose of inserting the boxing in the hub, which is provided with a recess for the reception of the nut G', into which the boxing is then screwed, both being provided with threads agreeing with the forward motion of the wheel and be kept tight by the motion thereof.

By properly tightening the axle-nut H sufficient pressure will be put on the washers C E and intermediate packing, D, to prevent leakage of the lubricating matter at that part of the axle, at the outer or end part of which a similar effect will be obtained by means of the pressure produced on washer F and packing $H^2$, which by reason of being flanged inwardly, as shown, will prevent leakage through the axle-nut, and by thus keeping the groove $a$ full of lubricating matter cause a more uniform and constant distribution of the same over the body of the axle. Should the washers and packing become too much worn to receive pressure from the axle-nut H, they may be readily replaced by new parts.

Having explained the construction and operation of my improvement, what I claim as new, and desire to secure by Letters Patent, is—

The axle-nut H, packing $H^2$, washer F, washer E, packing D, and washer C, in combination with the grooved axle and oil-cup, all constructed and arranged to operate as specified, for the purpose set forth.

In testimony whereof I affix my signature in presence of two witnesses.

HOLCOMB OLSON.

Witnesses:
   CHAS. F. REMICK,
   W. V. GOODNOW.